(12) United States Patent
Legare et al.

(10) Patent No.: US 9,744,493 B2
(45) Date of Patent: Aug. 29, 2017

(54) AIR FILTRATION DEVICE

(75) Inventors: Pierre Legare, Brockville (CA); Gary E. Dwyer, Mallorytown (CA); Andrew Murphy, Durham (GB); Simon J. Smith, Glenburnie (CA)

(73) Assignee: 3M Innovative Properties Company, St. Paul, MN (US)

( * ) Notice: Subject to any disclaimer, the term of this patent is extended or adjusted under 35 U.S.C. 154(b) by 193 days.

(21) Appl. No.: 12/935,630

(22) PCT Filed: Mar. 26, 2009

(86) PCT No.: PCT/US2009/038371
§ 371 (c)(1),
(2), (4) Date: Dec. 20, 2010

(87) PCT Pub. No.: WO2009/145992
PCT Pub. Date: Dec. 3, 2009

(65) Prior Publication Data
US 2011/0126713 A1 Jun. 2, 2011

Related U.S. Application Data

(60) Provisional application No. 61/042,299, filed on Apr. 4, 2008.

(51) Int. Cl.
*B01D 46/10* (2006.01)
*A62B 23/02* (2006.01)
(Continued)

(52) U.S. Cl.
CPC ........... *B01D 46/103* (2013.01); *A62B 23/02* (2013.01); *B01D 46/0023* (2013.01);
(Continued)

(58) Field of Classification Search
None
See application file for complete search history.

(56) References Cited

U.S. PATENT DOCUMENTS 3,142,549 A * 7/1964 Klusewitz et al. ............. 96/121
3,944,403 A * 3/1976 Simpson et al. ............... 96/131
(Continued)

FOREIGN PATENT DOCUMENTS

JP      05092118 A  *  4/1993
JP      H0592118       4/1993
(Continued)

OTHER PUBLICATIONS

Translation of JP 05092118 A.*
Intl Search Report for PCT/US2009/038371, 4 pages.

*Primary Examiner* — Amber R Orlando
*Assistant Examiner* — Phillip Shao
(74) *Attorney, Agent, or Firm* — Jeffrey M. Olofson

(57) ABSTRACT

Air filtering devices are disclosed that contain a first filter cartridge having a cartridge inlet and a cartridge outlet and a curved filter bed having a concave surface disposed such that air to be filtered passes through the inlet, the curved filter bed, and the outlet. The air filtering devices also contain a blower assembly having a blower inlet in fluid communication with the cartridge outlet and a blower outlet, the blower assembly includes a motor proximate to the concave surface of the curved filter bed. The motor has a rotational axis such that the rotational axis is adjacent to the center of curvature of the curved filter bed. The air filtering device may be used in powered air purifying respirators.

20 Claims, 5 Drawing Sheets

(51) Int. Cl.
    *B01D 46/00*     (2006.01)
    *B01D 46/30*     (2006.01)
    *B01D 46/52*     (2006.01)

(52) U.S. Cl.
    CPC ........... *B01D 46/30* (2013.01); *B01D 46/521* (2013.01); *B01D 2273/30* (2013.01)

(56) References Cited

U.S. PATENT DOCUMENTS

| | | | |
|---|---|---|---|
| 4,280,491 A | 7/1981 | Berg | |
| 4,462,399 A | 7/1984 | Braun | |
| 4,590,951 A | 5/1986 | O'Connor | |
| 4,965,887 A | 10/1990 | Paoluccio | |
| 5,033,465 A | 7/1991 | Braun | |
| 5,090,407 A * | 2/1992 | Lesage et al. | 128/205.27 |
| 5,125,402 A | 6/1992 | Greenough | |
| 5,222,488 A * | 6/1993 | Forsgren | 128/201.25 |
| 5,318,020 A * | 6/1994 | Schegerin | 128/205.12 |
| 5,394,870 A * | 3/1995 | Johansson | 128/205.22 |
| 5,579,761 A | 12/1996 | Yuschak | |
| 6,014,971 A | 1/2000 | Danisch | |
| 6,186,140 B1 * | 2/2001 | Hoague | 128/202.22 |
| 6,250,299 B1 | 6/2001 | Danisch | |
| D449,099 S | 10/2001 | Juhlin | |
| 6,298,849 B1 * | 10/2001 | Scholey et al. | 128/205.27 |
| D451,602 S | 12/2001 | Juhlin | |
| 6,328,791 B1 * | 12/2001 | Pillion et al. | 96/418 |
| 6,575,165 B1 | 6/2003 | Cook | |
| 6,666,209 B2 | 12/2003 | Bennett | |
| 6,834,646 B2 * | 12/2004 | Alon et al. | 128/201.22 |
| 6,854,464 B2 | 2/2005 | Mukaiyama | |
| 6,860,267 B2 * | 3/2005 | Capon et al. | 128/206.15 |
| 7,419,526 B2 * | 9/2008 | Greer et al. | 55/512 |
| 2003/0192541 A1 * | 10/2003 | Avery et al. | 128/204.18 |
| 2004/0079373 A1 | 4/2004 | Mukaiyama et al. | |
| 2004/0112381 A1 * | 6/2004 | Ujhazy et al. | 128/204.18 |
| 2006/0048782 A1 | 3/2006 | Gossweiler | |
| 2006/0196157 A1 | 9/2006 | Greer | |
| 2006/0231100 A1 | 10/2006 | Walker | |
| 2007/0131228 A1 * | 6/2007 | Croll et al. | 128/204.15 |

FOREIGN PATENT DOCUMENTS

| | | |
|---|---|---|
| WO | WO 02/11815 | 2/2002 |
| WO | WO 02/056966 | 7/2002 |
| WO | WO 2006/096284 | 9/2006 |

* cited by examiner

AIR FILTRATION DEVICE

CROSS REFERENCE TO RELATED APPLICATIONS

This application is a national stage filing under 35 U.S.C. 371 of PCT/US2009/038371, filed Mar. 26, 2009, which claims priority to U.S. Application No. 61/042,299, filed Apr. 4, 2008, the disclosure of which is incorporated by reference in its/their entirety herein.

FIELD OF THE DISCLOSURE

The present disclosure pertains to air filtration devices, especially powered air filtration devices.

BACKGROUND

Supplied air respirators are regularly worn in environments where the surrounding air contains contaminants. Clean air is delivered to the wearer from a supply tank or from a powered air source that drives the ambient air through an air filter.

Systems that use a powered air source to supply clean air to the wearer are referred to as powered air purifying respirators—known shorthand as "PAPRs". PAPRs typically have two main parts: a facepiece and a filtering unit. The facepiece is worn at least over the nose and mouth of the user (it also may cover the eyes and ears), and the filtering unit is commonly worn about the user's waist. The filtering unit often includes filter cartridges, a housing, a fan, and an electric motor that drives the fan. The fan and motor are contained within the housing, and the filter cartridges are attached to the housing body. Ambient air is filtered by being forced through filter elements that are contained within the filter cartridges. This filtered air is then delivered to the facepiece through a hose. The electrically powered fan drives the air from the filter cartridges, through the hose, and into the facepiece interior. Because the fan does the work required for air movement through the PAPR system, the user is able to comfortably receive a clean supply of air with little effort.

SUMMARY

Air filtering devices of one exemplary embodiment of the present disclosure comprise a first filter cartridge having a cartridge inlet and a cartridge outlet and a curved filter bed having a concave surface disposed such that air to be filtered passes through the inlet, the curved filter bed, and the outlet. The air filtering devices also comprise a blower assembly having a blower inlet in fluid communication with the cartridge outlet and a blower outlet, the blower assembly comprises a motor proximate to the concave surface of the curved filter bed and the motor has a rotational axis such that the rotational axis is adjacent to the center of curvature of the curved filter bed.

The disclosure is more fully shown and described in the drawings and detailed description, where like reference numerals are used to represent similar parts. It is to be understood, however, that the drawings and description are for the purposes of illustration only and should not be read in a manner that would unduly limit the scope of this disclosure.

DETAILED DESCRIPTION

Figure 1:
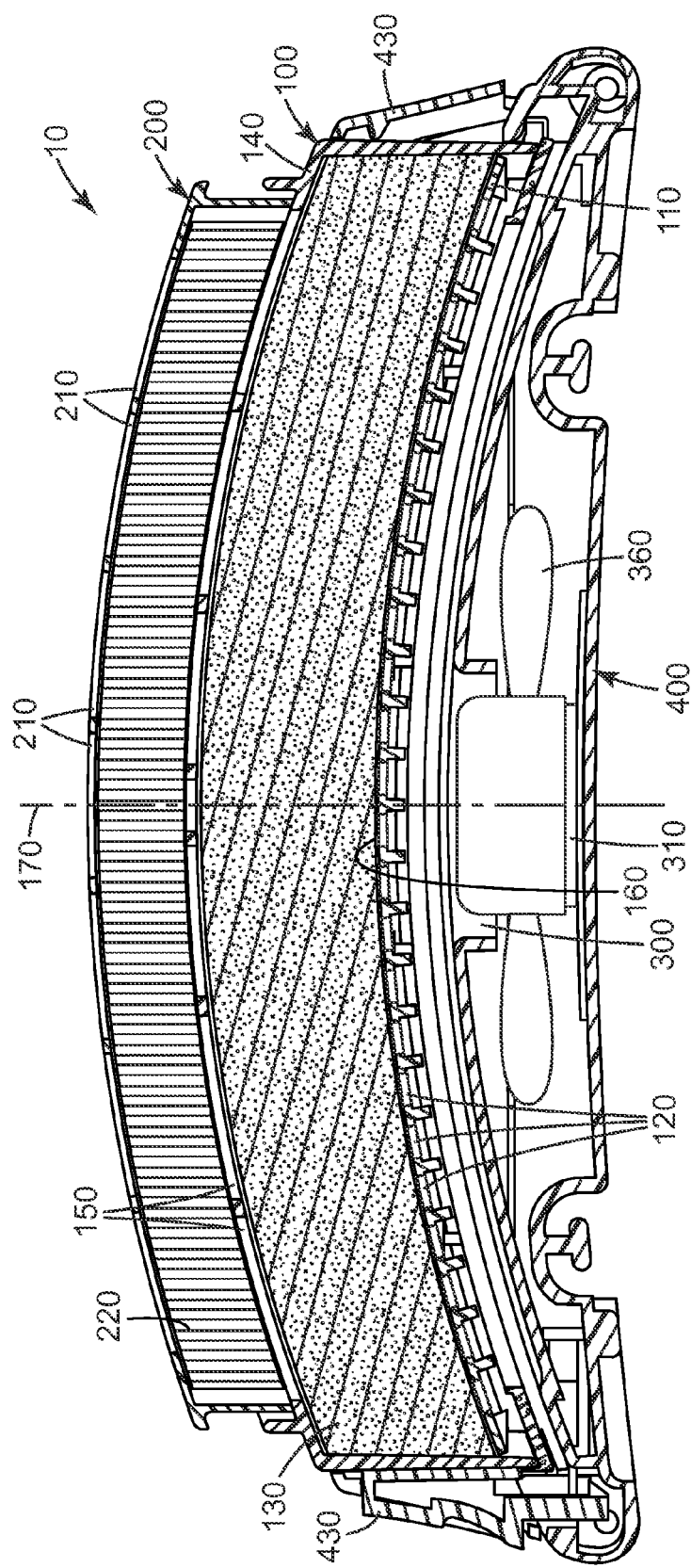
FIG. 1 shows schematically a cross sectional view of a portion of an exemplary embodiment of an air filtering device.

The present disclosure provides a powered, portable air filtering device that is designed to be carried by a user to supply purified air to the user. Air filtering devices are regularly used in environments where the surrounding air contains contaminants or may potentially contain contaminants. Such contaminants include, for example, fumes, gases, particulates, vapors and the like which may be present alone or in combination. The air filtering device may be part of a powered air purifying respirator or PAPR.

The air filtering device that contains a curved filter bed is beneficial to the user because it provides a more compact system. The more compact system, or "low profile system" offers the user better comfort and reduces the likelihood that the air filtering device will interfere with or become snagged during the performance of tasks. This compactness is achieved without sacrificing air delivery performance.

Lower profile air filtering devices are advantageous for the users because they offer the users better comfort and being less cumbersome are less likely to interfere with the performance of tasks performed by the user.

As used herein the terms "clean air or purified air" means air (or other oxygen-containing gas) that has been filtered;

the term "breathing head gear" means an apparatus to which purified air is supplied that is worn by a person, such breathing head gear includes for example facepieces which fit snugly over at least the respiratory passages (nose and mouth) of a person, as well as loose fitting facepieces: examples of breathing head gear include but are not limited to, elastomeric facepiece respirators, full face respirators, head covers such as soft hoods or hard headtops and other suitable respirator systems;

the term "filter bed" means a structure that includes a filter element and that is adapted for connection to or use in a filtering unit, a "curved filter bed" is one that is not planar but has a radius of curvature; generally the curved filter bed is continuous over the length of curvature, i.e. it is not subdivided along the length of curvature into different filter modules; typically the filter bed includes adsorbent particles;

the term "filter cartridge" means a structure that includes a filter element and that is adapted for connection to or use in a filtering unit, a "curved filter cartridge" is one that is not planar but has a radius of curvature;

the term "filtering unit" means the portion of a PAPR that is responsible for filtering ambient air and causing powered air movement;

the term "hose" means a device that includes a conduit that has fluid impermeable wall(s) through which air can travel for delivering clean air from a clean air supply source to breathing headgear;

the term "powered air purifying respirator or PAPR" means a supplied air respirator that uses a power source to deliver filtered air to breathing headgear;

the term "center of curvature" refers to the center of the arc formed by a curved filter bed or curved filter cartridge. For example, if the curvature of the filter bed is cylindrical, the center of curvature is a line, while for spherical curvature, the center of curvature is a point. For more complicated types of curvatures, the center of curvature may be an area. For example, referring to FIG. 1, the center of curvature of air filtering device 10 lies on the line defined by the intersection of the surface 160 and a plane perpendicular to the plane of the drawing, represented by line 170.

Air filtering devices of the present disclosure comprise a first filter cartridge having a cartridge inlet and a cartridge outlet and a curved filter bed having a concave surface disposed such that air to be filtered passes through the inlet, the curved filter bed, and the outlet. The air filtering devices also comprise a blower assembly having a blower inlet in fluid communication with the cartridge outlet and a blower outlet, the blower assembly comprises a motor proximate to the concave surface of the curved filter bed and the motor has a rotational axis such that the rotational axis is adjacent to the center of curvature of the curved filter bed.

Generally the air filtering device is contained within a housing. The housing may contain, for example, a housing base, attachment means for attaching one or more filter cartridges, and a cover. The use of a housing permits the components of the air filtering device to be held in fluid communication with each other and protects the components from impact, damage, etc.

The housing is typically designed to be impermeable to the fluid to be filtered under the conditions in which the air filtering device is to be used. Some potentially suitable materials for the housing may include plastics, metals, composites, etc.

The housing base typically contains the blower assembly. The blower assembly contains a blower inlet which is in fluid communication with the outlet of a filter cartridge, and a blower outlet which may be attached to, for example, a hose which is connected to breathing head gear. The fluid communication between the blower assembly and filter bed may be via an impeller opening, for example, a ring-shaped impeller opening. Generally the ring-shaped impeller opening is formed by gap between the motor and the blower outlet. For example, in FIG. 3, the ring shaped impeller opening 320 is disposed between the motor 310 and the edge of blower inlet 300. Generally, the entire ring-shaped impeller opening is exposed to (or covered by) the concave surface of the curved filter bed. The entire impeller opening is exposed to the concave surface of the curved filter bed when a projection of the impeller opening onto the concave surface of the curved filter bed is disposed entirely on the concave surface of the curved filter bed.

The blower assembly also contains a blower fan and a motor assembly. The motor assembly may include a blower motor. The motor is located proximate to the concave surface of the curved filter bed. The motor has a rotational axis such that the rotational axis is adjacent to the center of curvature of the curved filter bed. The blower motor drives the blower fan which causes the air to flow through the air filtering device. Typically the blower motor is a brushless DC motor. In general, because the air filtering device is intended to be portable, the power source may advantageously include batteries, either rechargeable or non-rechargeable.

The housing base may also include the blower outlet. The blower outlet is typically a single opening, but in some embodiments it may comprise a series of openings. In some embodiments the outlet port is a cylindrical opening, but other shapes and contours may be used. The opening may also include structures designed to releasably attach the air filtering device to, for example, a hose or other connecting apparatus to supply purified air to a breathing headpiece or other device.

The housing may also contain a mechanism for removably attaching one or more filter cartridges. A variety of different mechanisms may be used to removably attach one or more filter cartridges to the housing. Typically mechanical attachment devices are used to attach the filter cartridge to the housing, such as screws, fasteners, clips, latches and the like. One connection structure includes snap-fit filter cartridges (see, for example, U.S. Pat. No. 5,579,761). Another alternative includes a threaded filter cartridge that is attached to a corresponding threaded fitting on the respirator housing.

The housing may also contain a cover. The cover is generally located on top of the filter cartridge or filter cartridges and is in fluid communication with the outermost filter cartridge (i.e. the one farthest from the blower assembly). The use of a cover helps to contain and protect the filter cartridge or filter cartridges within the housing. Typically the cover contains a mechanism for attachment to the base, to the filter cartridge(s) or both. The attachment mechanisms include the ones discussed above for attachment of the filter cartridges to the base. The cover also includes an opening or a series of openings to admit fluid (for example, air) into the outermost filter cartridge. The openings may be, for example, one or more of slots, circular voids, triangular voids, rectangular voids, a porous mesh, screen, etc.

The air filtering device contains one or more filter cartridges. At least one filter cartridge contains at least one curved filter bed. The curved filter beds generally have a concave shape (when viewed from the outlet side of the filter cartridge, the curved filter beds have a convex shape when viewed from the inlet side of the filter cartridge). The curved filter beds include a bed of filter material located on a support plate or between a pair of support plates, wherein the major surfaces of the support plates facing the bed of filter material are each curved about at least one axis. In some embodiments, the curvature imparted by the support plates provides the curved configuration to the filter bed. At least a portion of the bed of filter material is retained under residual compression between the support plates.

In some embodiments the filter cartridge includes a case which contains the curved filter bed and also contains an inlet and an outlet. A filter cartridge case helps to hold the components of the filter cartridge in place and is designed to fit within the air filtering device housing. The filter cartridge case is typically designed to be impermeable to the fluid to be filtered under the conditions in which the air filtering device is to be used. Some potentially suitable materials for the case may include plastics, metals, composites, etc. The curved bed of filter material is contained within the case such that a fluid to be filtered passes through the case inlet, the filter material, and the case outlet. A first support plate is positioned between the bed of filter material and the outlet, such that the first support plate has a major surface facing the bed of filter material that includes curvature about at least one axis. A second support plate is positioned between the bed of filter material and inlet, such that the second support plate includes a major surface facing the bed of filter material that also includes curvature about at least one axis.

In some embodiments the bed of filter material is loose particulate filter material that is retained under residual compression between the support plates within the filter cartridge. To reduce premature breakthrough and promote full use of the filter material, it may also be preferred that the thickness of the filter material between the two support plates be uniform (within normal manufacturing tolerances).

The bed of filter material may take a variety of forms, although typically it may include adsorbent particles, such as loose adsorbent particles. The adsorbent particles may be of any type known to be suitable for removing gases and vapors from fluids such as air to be inhaled through a respirator. Examples of some potentially suitable adsorbent particles may include, for example, ion exchange resins, activated charcoal (that may be impregnated with, for example, amine triethylenediamine or heavy metal salts such as copper, silver, zinc, molybdenum, etc.), zeolites, treated activated alumina, or metal-organic frameworks (MOFs), etc. By "loose" as used herein, it is meant that the adjacent particles are not physically attached to each other to form a self-supporting filter structure, for example, through the use of binders such as polymers, foams, etc. As a result, the loose particles may be in granular or pellet forms that are amenable to delivery through storm filling or similar processes.

More than one type of filter material may be used. For example, the curved filter bed may comprise multiple layers of differing types of loose filter material. The multiple layered filter bed may be prepared using the storm filling technique by the sequential depositing of different filter materials.

In some embodiments, manufacture of the filter cartridges involves depositing a bed of filter material on a flat (within normal manufacturing tolerances) horizontally oriented support plate located within a cartridge case. The bed of filter material may in some instances be deposited by storm filling in view of its suitability for providing uniform thickness packed beds with desired packing density. Storm filling typically involves pouring the particles through a series of screens that scatter the particles as they fall, creating a level bed of filter material. After the filter material has been deposited, the support plates may preferably be deformed such that the major surfaces of the support plates that face the bed of filter material each have a concave curvature about at least one axis.

The deformation of the support plates may result in residual compression of the bed of filter material such that at least a portion of the bed is retained in compression between the support plates. In some embodiments, it may be preferred that the residual compression be provided by an elastically deformed support plate located within the curved filter cartridge.

One potential advantage of the manufacturing method described is that conventional storm filling techniques may be used to deposit the bed of filter material which is economical and can enhance uniformity in the density of the filter material. Another potential advantage is that if layers of different filter materials are to be used in the same filter cartridge, storm filling offers a convenient method of depositing the layers while maintaining separation between the different layers.

Typically the curved filter bed is of a thickness that permits it to usefully filter impurities from the fluid to be filtered and yet retain a low profile. In some embodiments the curved filter bed is between 1.0 centimeter and 5.0 centimeters in thickness.

The filter cartridge may be prepared by providing a case that includes a bottom portion and a top portion. When put together the bottom portion and the top portion form the filter cartridge case. The method for preparing the filter cartridge may include placing a first support plate within the bottom portion of the case, depositing a bed of filter material onto the first support plate located within the bottom portion of the case. A second support plate may be added on top of the deposited filter material. The first support plate (and second support plate if present) is deformed after depositing the bed of filter material, such that the major surface of the first support plate that faces the filter material comprises curvature about at least one axis. Typically the curvature is cylindrical, but other types of curvatures are within the scope of the present disclosure. The top portion of the filter cartridge case is attached to the bottom portion to complete the filter cartridge. The filter cartridge case may be in any useful shape, but typically the case is curved with a curvature similar to or the same as the curvature of the filter bed.

The curvature imparted to the bed by the support plates may be determined with reference to an axis normal to one of the major surfaces of the support plate. The curvature may be uniform or it may vary over the surface of the bed. Examples of suitable curved surfaces may be defined by one or more ellipses, circles, etc. One manner for characterizing the curvature is by the radius of curvature at one or more points or sections of the major surfaces of the support plate. In some embodiments this radius of curvature is, for example, 1 meter or less, or 0.5 meters or less, or even 20 centimeters or less.

Another manner for characterizing the curvature in the filter beds and support plates of the filter cartridge is by the deflection imparted to at least a portion of the support plate as a result of the deformation from a planar configuration. In some embodiments, this displacement (deformation from a planar configuration) may be, for example, 5 millimeters or more, or even 10 millimeters or more.

The curvature provided may be defined about two or more axes, and those two or more axes may be parallel to each other or not. For example, generally the curvature is a compound curvature such that curved surfaces are imparted to the bed and surrounding structures (for example, support plates). The curvature selected may preferably be designed to, for example, match the contour and/or the size of the other components of the air filtering device to which the cartridge is to be connected, to reduce the profile of the air filtering device.

In the air filtering device, a single filter bed may be used or more than one filter bed may be used. This may be achieved through the use of filter cartridges with more than one filter bed or through the use of multiple filter cartridges. If a single filter cartridge is used, it may be as described above, or it may be modular in design. If the filter cartridge contains two modules, generally, both modules are curved. In some embodiments a first module is a filter bed containing filter material as described above. In these embodiments a second module may contain a particulate filter. The particulate filter may be in the form, for example, of a nonwoven pleated web, an open cell foam, a pleated membrane, combinations of two or more filters, etc.

In the filter cartridges that contain more than one filter bed, typically one filter bed is of a thickness of between 1.0 centimeter and 5.0 centimeters and the second filter bed is of a thickness of between 0.5 centimeter and 3.0 centimeters.

If more than one filter cartridge is used, the filter cartridges may be the same or different. In some embodiments two filter cartridges are used and are located in the air filtering device in the general configuration: housing cover; second filter cartridge; first filter cartridge; housing base. The housing base typically includes a blower assembly and a motor included therein. In these embodiments the first filter cartridge contains a curved filter bed containing filter material as described above. Typically, the second filter cartridge contains a particulate filter which may be in the form, for example, of a nonwoven pleated web, an open cell foam, a pleated membrane, combinations of two or more filters, etc.

The filter cartridges may generally contain a gasketing system such that when the filter cartridges are contained within the air filtering device housing they are reliably sealed such that air enters the air filtering device only through the inlet. The reliable seal is obtained and maintained through compression applied to sealing gaskets. Typically the gaskets for the filter cartridges are designed to not add to the profile of the air filtering device. In some embodiments, the gaskets are present around the periphery of the filter cartridge to aid in presenting a low profile.

The air filtering devices are typically designed to be portable. They may be transported in any suitable way, such as by carrying, or by being worn by the user. Generally they are worn by the user, for example about the waist using a belt carrier, or on the shoulders using a backpack configuration. In some embodiments the air filtering device includes a belting system which permits the air filtering device to be worn on the user's body. The belting system is generally adjustable to accommodate a variety of waist sizes.

Referring to the figures, FIG. 1 shows schematically a cross sectional view of a portion of an exemplary embodiment of an air filtering device. In this embodiment two filter cartridges in fluid communication with each other are present. In FIG. 1, air filtering device 10 comprises housing base 400 and first filter cartridge 100 and second filter cartridge 200. First filter cartridge 100 comprises first support plate 110, second support plate 140 and curved filter bed 130. First support plate 110 has concave surface 160. Concave surface 160 has a center of curvature indicated by line 170. First support plate 110 contains cartridge outlet 120 which comprises a plurality of openings and second support plate 140 contains cartridge inlet 150 which comprises a plurality of openings. Second filter cartridge 200 includes cartridge inlet 210 which comprises a plurality of openings and curved filter 220 which comprises a pleated filter material. Housing base 400 comprises blower inlet 300 which is in fluid communication with the first filter cartridge 100. Motor 310 is located in blower inlet 300 proximate to concave surface 160 and has an axis of rotation which corresponds to line 170. Although in this exemplary embodiment the center of curvature of the curved filter bed 130 and the axis of rotation of the motor 310 are illustrated by the same line 170, they do not have to be located in the same plane. For example, in some exemplary embodiments, the axis of rotation of the motor 310 may be disposed such that the impeller opening (shown in FIG. 3) is completely covered by the curved filter bed 130. Fan 360 is attached to motor 310. Latches 430 are attached to housing base 400 and allow removable attachment of filter cartridge 100 from housing base 400.

Figure 2:
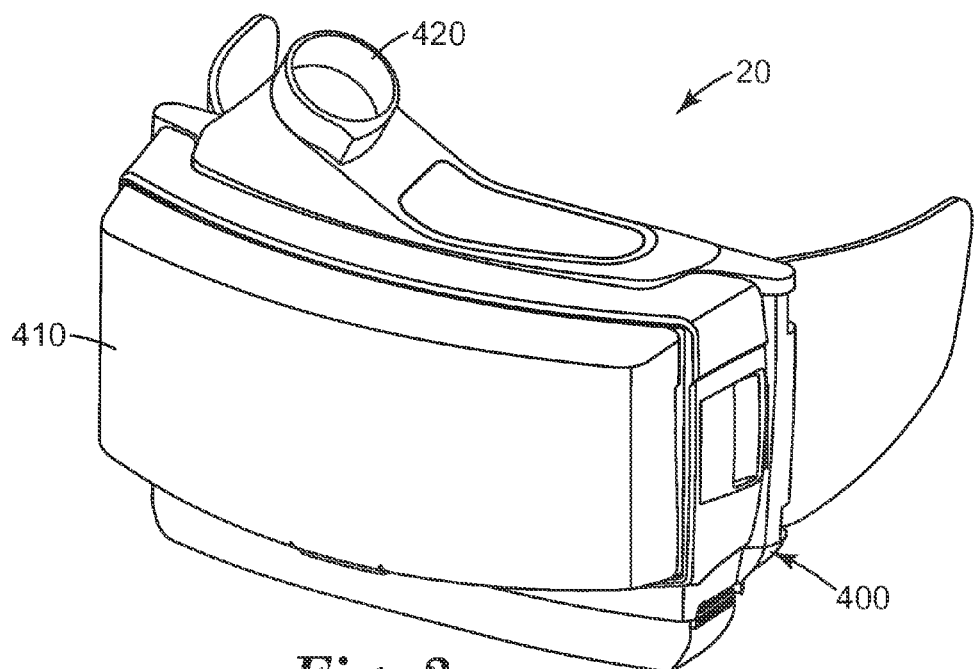
FIG. 2 shows schematically a perspective view of an exemplary embodiment of an air filtering device.

FIG. 2 shows schematically a perspective view of an exemplary embodiment of an air filtering device. In FIG. 2, air filtering device 20 comprises housing base 400 and cover piece 410. Housing base 400 also comprises blower outlet 420 which may connect to a hose or other outlet device (not shown).

Figure 3:
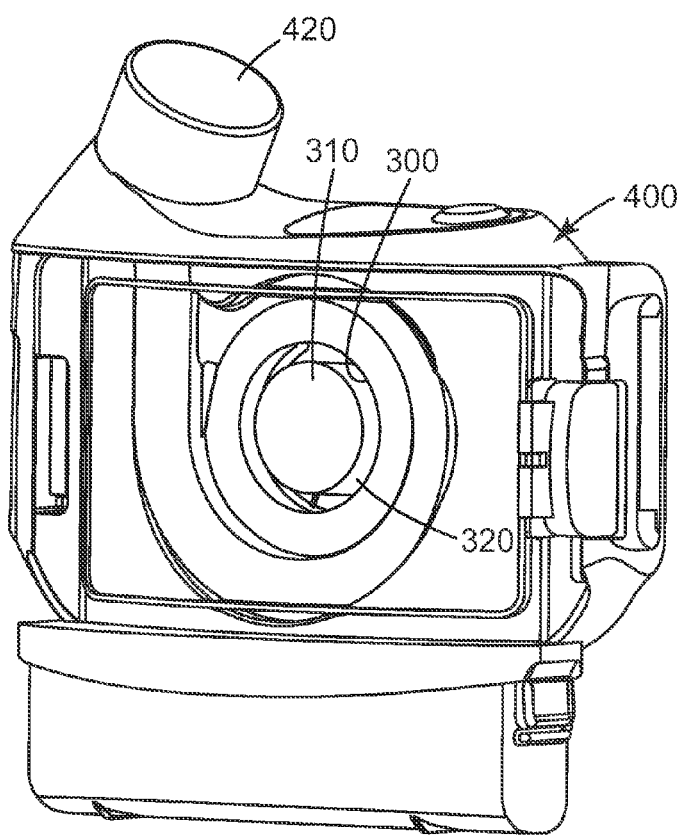
FIG. 3 shows schematically a perspective view of a housing base for an exemplary embodiment of an air filtering device.

FIG. 3 shows schematically a perspective view of a housing base for an exemplary embodiment of an air filtering device. Housing base 400 comprises blower inlet 300, which contains motor 310. Blower inlet 300 is configured to be in fluid communication with cartridge outlet (not shown) via ring-shaped opening 320 between motor 310 and edge of blower inlet 300, herein referred to as an impeller opening.

Figure 4:
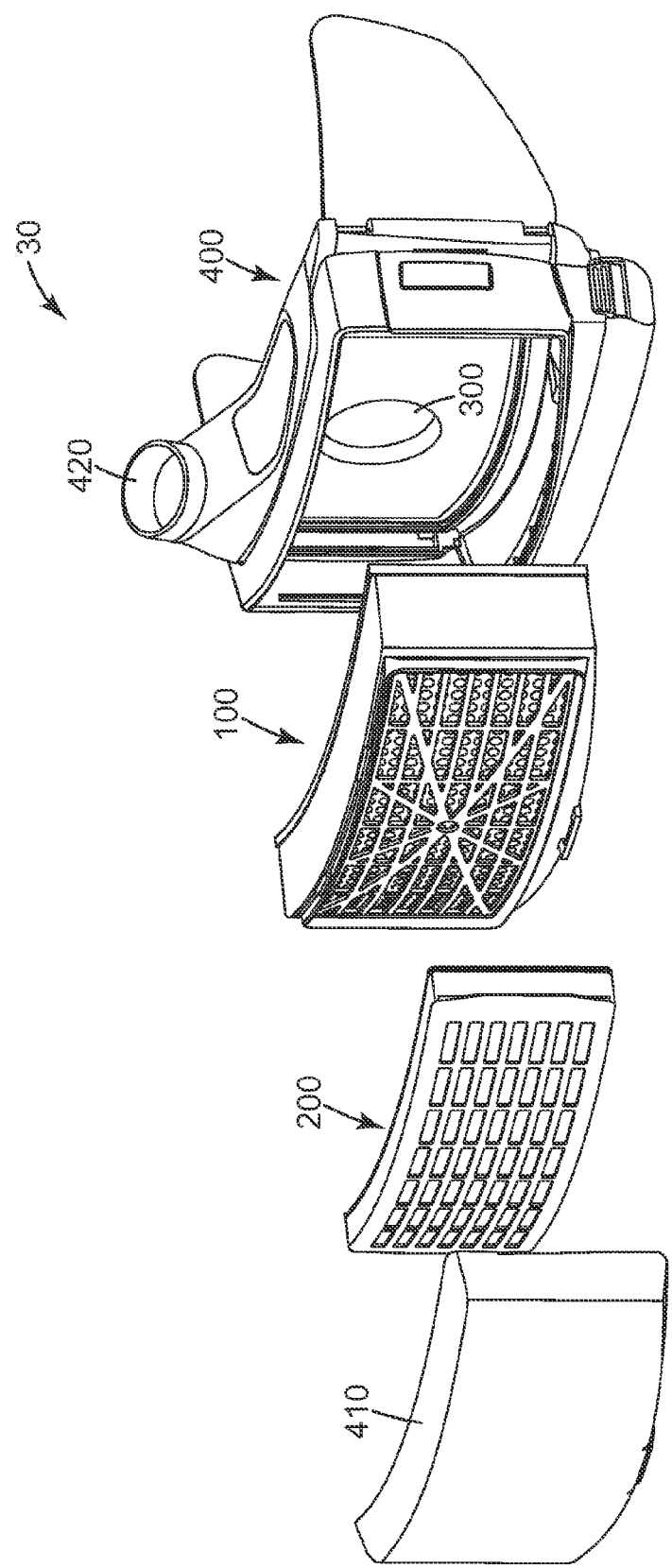
FIG. 4 shows schematically an exploded view of an exemplary embodiment of an air filtering device.

FIG. 4 shows schematically an exploded view of a an exemplary embodiment of an air filtering device. In FIG. 4, air filtering device 30 comprises housing base 400 and first filter cartridge 100, second filter cartridge 200 and cover piece 410. Housing base 400 comprises blower inlet 300 and blower outlet 420.

Figure 5:
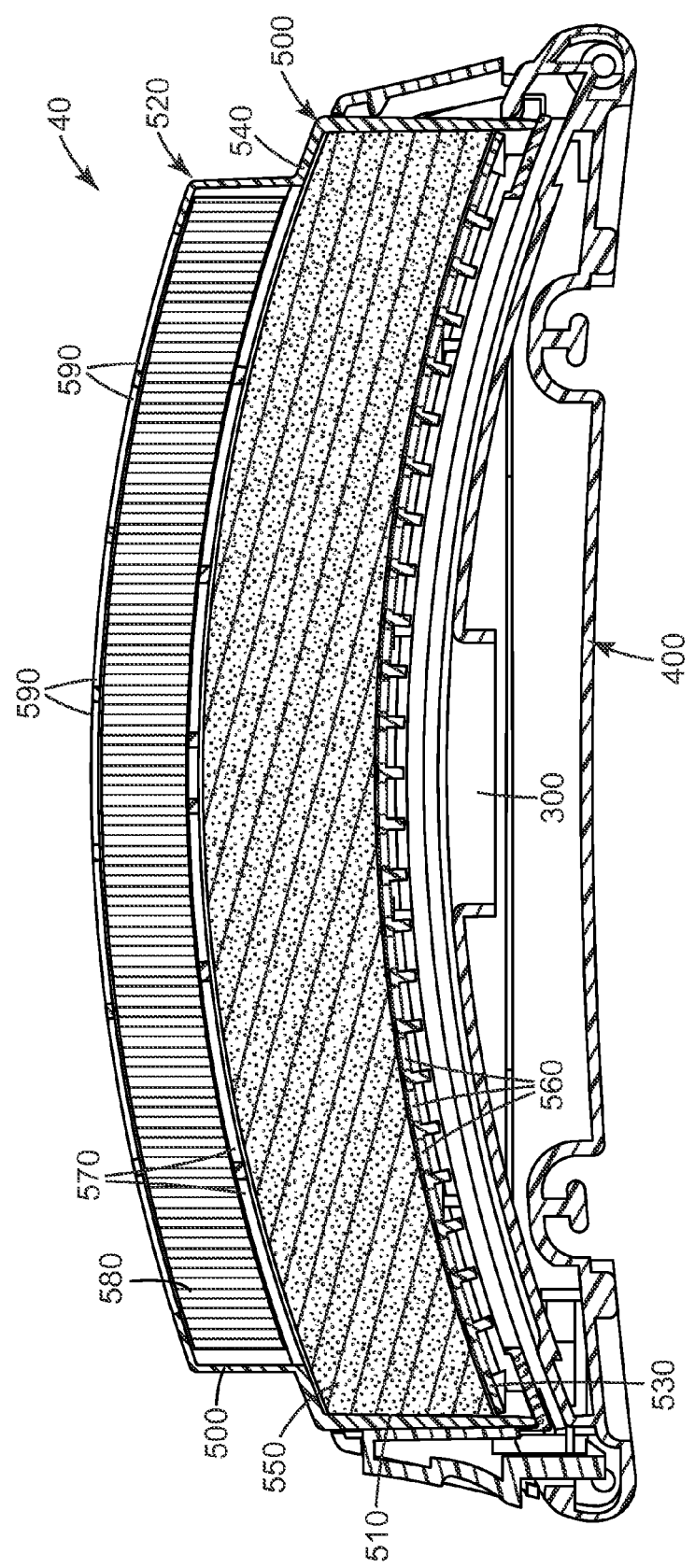
FIG. 5 shows schematically a cross sectional view of a portion of an exemplary embodiment of an air filtering device.

FIG. 5 shows schematically a cross sectional view of a portion of an exemplary embodiment of an air filtering device. In this embodiment the filter cartridge contains two modules, one module contains the curved filter bed, and the other module contains a pleated filter material. In FIG. 5, air filtering device 40 comprises housing base 400 and filter cartridge 500. Filter cartridge 500 comprises two filter modules 510 and 520. First filter module 510 comprises first support plate 530, second support plate 540 and curved filter bed 550. First support layer 530 contains a plurality of openings 560 and second support layer 540 contains a plurality of openings 570. Second filter module 520 is in fluid communication with first filter module 510 by the plurality of openings 570. Second filter module 520 comprises a plurality of openings 590 and pleated filter material 580. Housing base 400 comprises blower inlet 300 which is in fluid communication with the filter cartridge 500.

Figure 6:
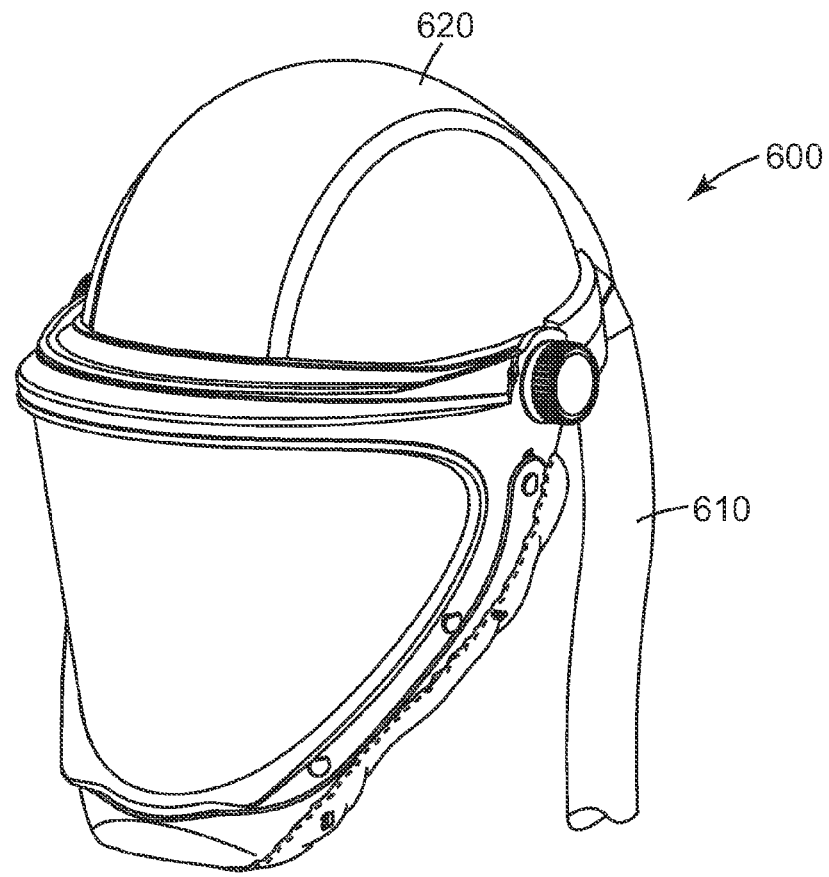
FIG. 6 shows schematically a perspective view of an exemplary embodiment of a powered air purifying respirator.
Figure 6:
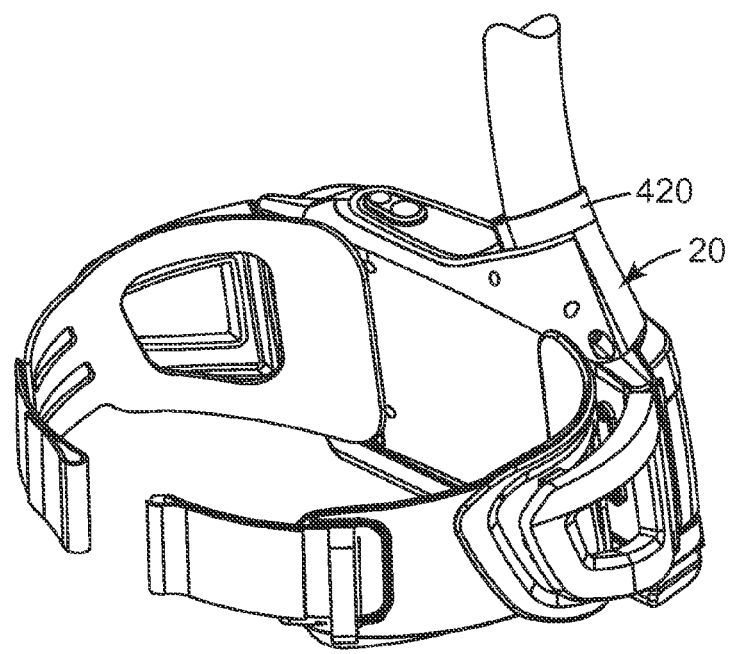

FIG. 6 shows schematically a perspective view of an exemplary embodiment of a powered air purifying respirator. In FIG. 6, powered air purifying respirator 600 includes air filtering device 20 with blower outlet 420. Hose 610 is attached to blower outlet 420 on one end and attached to exemplary breathing head gear 620 on another end.

Exemplary embodiments of this disclosure have been discussed and reference has been made to some possible variations within the scope of this disclosure. These and other variations and modifications will be apparent to those skilled in the art without departing from the scope of the disclosure, and it should be understood that this disclosure is not limited to the exemplary embodiments set forth herein. Accordingly, the invention is to be limited only by the claims provided below and equivalents thereof.

What is claimed is:
1. An air filtering device comprising:
   a first filter cartridge comprising:
      a case having a top portion that includes a cartridge inlet and a bottom portion that includes a cartridge outlet; and
      a curved filter bed contained in the case and having a concave surface disposed such that air to be filtered passes through the cartridge inlet, the curved filter bed, and the cartridge outlet; and
   a housing comprising:
      a housing base that includes a contoured surface and a blower assembly having a blower inlet in the contoured surface in fluid communication with the cartridge outlet and a blower outlet, the blower assembly comprising a motor proximate to the concave surface of the curved filter bed and wherein the motor has a rotational axis such that the rotational axis is adjacent to the center of curvature of the curved filter bed, wherein the air filtering device has a low profile;
      a housing cover configured to contain the first filter cartridge in the housing; and a mechanism of removable attachment of the housing cover to the housing base, wherein the first filter cartridge is curved to form a displacement, wherein at least a portion of the blower assembly is positioned in the displacement, and wherein the top portion, the bottom portion, and the contoured surface have a curvature similar to the concave surface of the curved filter bed.

2. The air filtering device of claim 1 wherein the curved filter bed contains a first support plate comprising a plurality of openings and a second support plate comprising a plurality of openings and a curved bed of filter material between the first support plate and the second support plate such that the first support plate is positioned between the bed of filter material and the cartridge outlet, and wherein the first support plate comprises a major surface facing the bed of filter material that comprises curvature about at least one axis; and the second support plate is positioned between the bed of filter material and the cartridge inlet, wherein the second support plate comprises a major surface facing the bed of filter material that comprises curvature about at least one axis.

3. The air filtering device of claim 2 wherein the filter material comprises at least one layer of loose filter material which is selected from the group consisting of activated carbons, zeolites, or metal-organic frameworks.

4. The air filtering device of claim 2, wherein the curvature of at least one of the first support plate and the second support plate is the result of elastic deformation.

5. The air filtering device of claim 2, wherein the curvature of the major surface of the first support plate comprises a radius of curvature at one or more points or sections of the major surface of 1 meter or less.

6. The air filtering device of claim 2, further comprising a second filter bed positioned between the inlet and the second support plate.

7. The air filtering device of claim 6, wherein the second filter bed comprises a pleated filter material.

8. The air filtering device of claim 1 further comprising a second filter cartridge in fluid communication with the first filter cartridge.

9. The air filtering device of claim 8 wherein the second filter cartridge comprises a pleated filter.

10. The air filtering device of claim 8 wherein the second filter cartridge is curved.

11. The air filtering device of claim 8 wherein the second filter cartridge is removable by a mechanism of removable attachment with respect to the first filter cartridge.

12. The air filtering device of claim 1 wherein the blower assembly inlet comprises a ring-shaped impeller opening.

13. The air filtering device of claim 12 wherein the entire ring-shaped impeller opening is exposed to the concave surface of the curved filter bed.

14. The air filtering device of claim 1 wherein the motor assembly comprises a brushless DC motor.

15. The air filtering device of claim 1 further comprising a hose attached to the outlet of the air filtering device and breathing head gear attached to the hose.

16. The air filtering device of claim 1 wherein the curved filter bed has a thickness of from 1.0 to 5.0 centimeters.

17. The air filtering device of claim 6 wherein the first filter bed has a thickness of from 1.0 to 5.0 centimeters and the second filter bed has a thickness of from 0.5 to 3.0 centimeters.

18. The air filtering device of claim 1 further comprising a belting system enabling the mounting of the air filtering device to a user's body.

19. The air filtering device of claim 1 wherein the curved filter bed comprises adsorbent particles.

20. The air filtering device of claim 1, wherein the motor is located in the blower inlet.

* * * * *

UNITED STATES PATENT AND TRADEMARK OFFICE
CERTIFICATE OF CORRECTION

PATENT NO. : 9,744,493 B2  
APPLICATION NO. : 12/935630  
DATED : August 29, 2017  
INVENTOR(S) : Pierre Legare Page 1 of 1

It is certified that error appears in the above-identified patent and that said Letters Patent is hereby corrected as shown below:

In the Specification

<u>Column 8</u>  
Line 6, after "of" delete "a".

Signed and Sealed this  
Eleventh Day of June, 2019

Andrei Iancu  
*Director of the United States Patent and Trademark Office*